Patented June 10, 1941

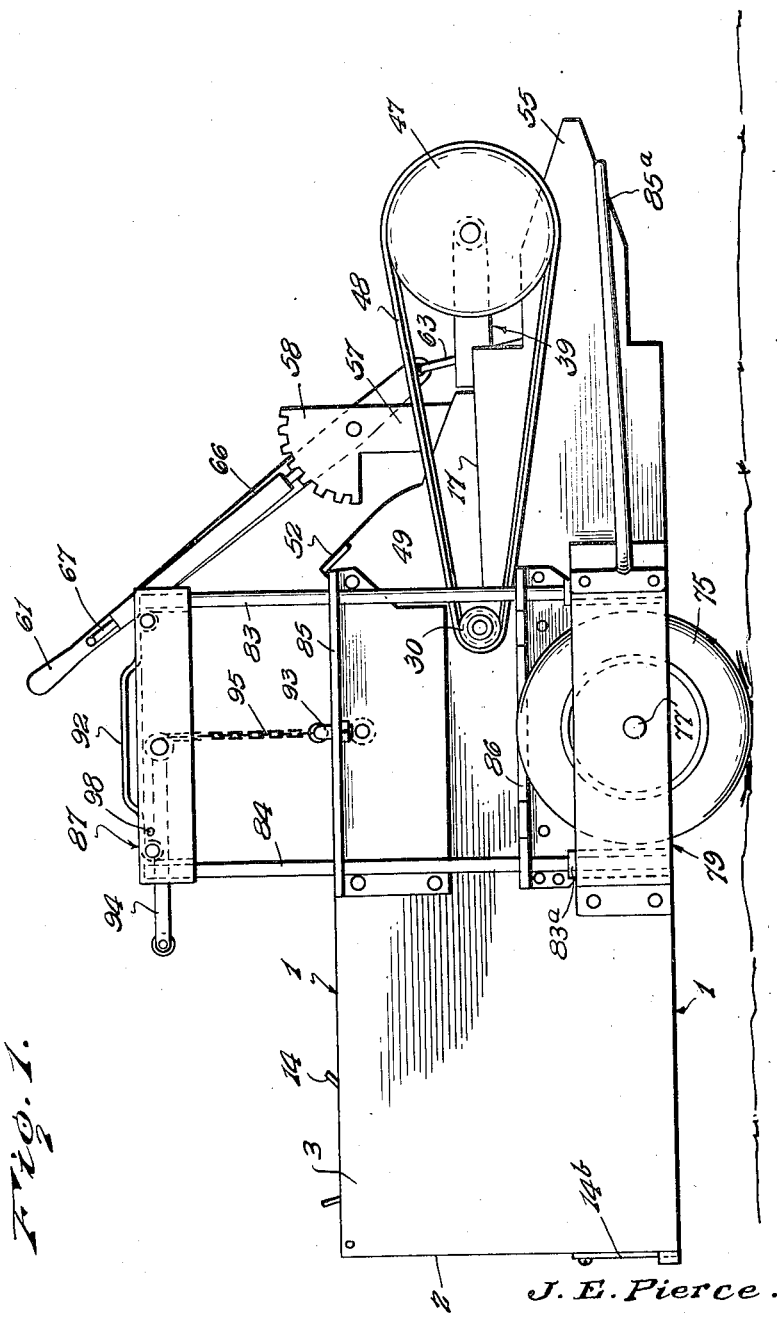

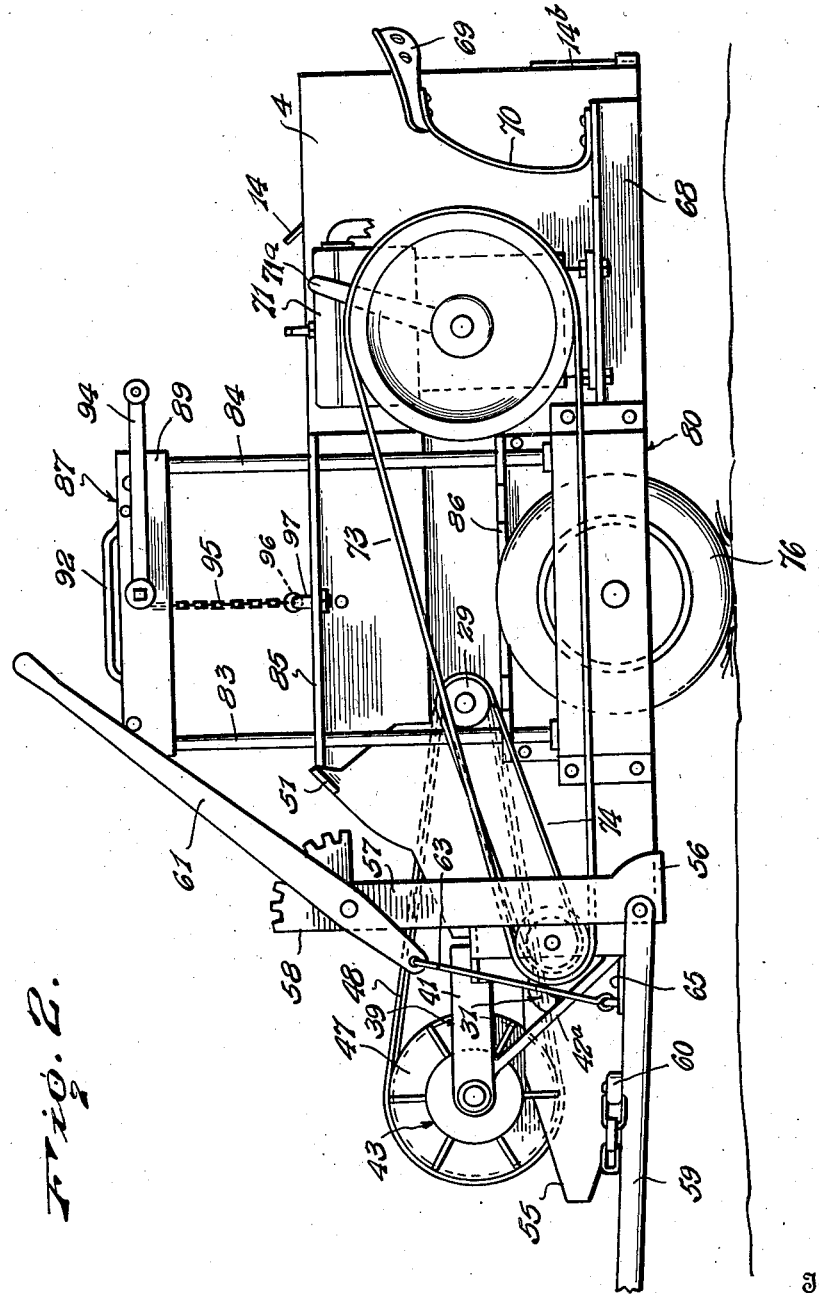

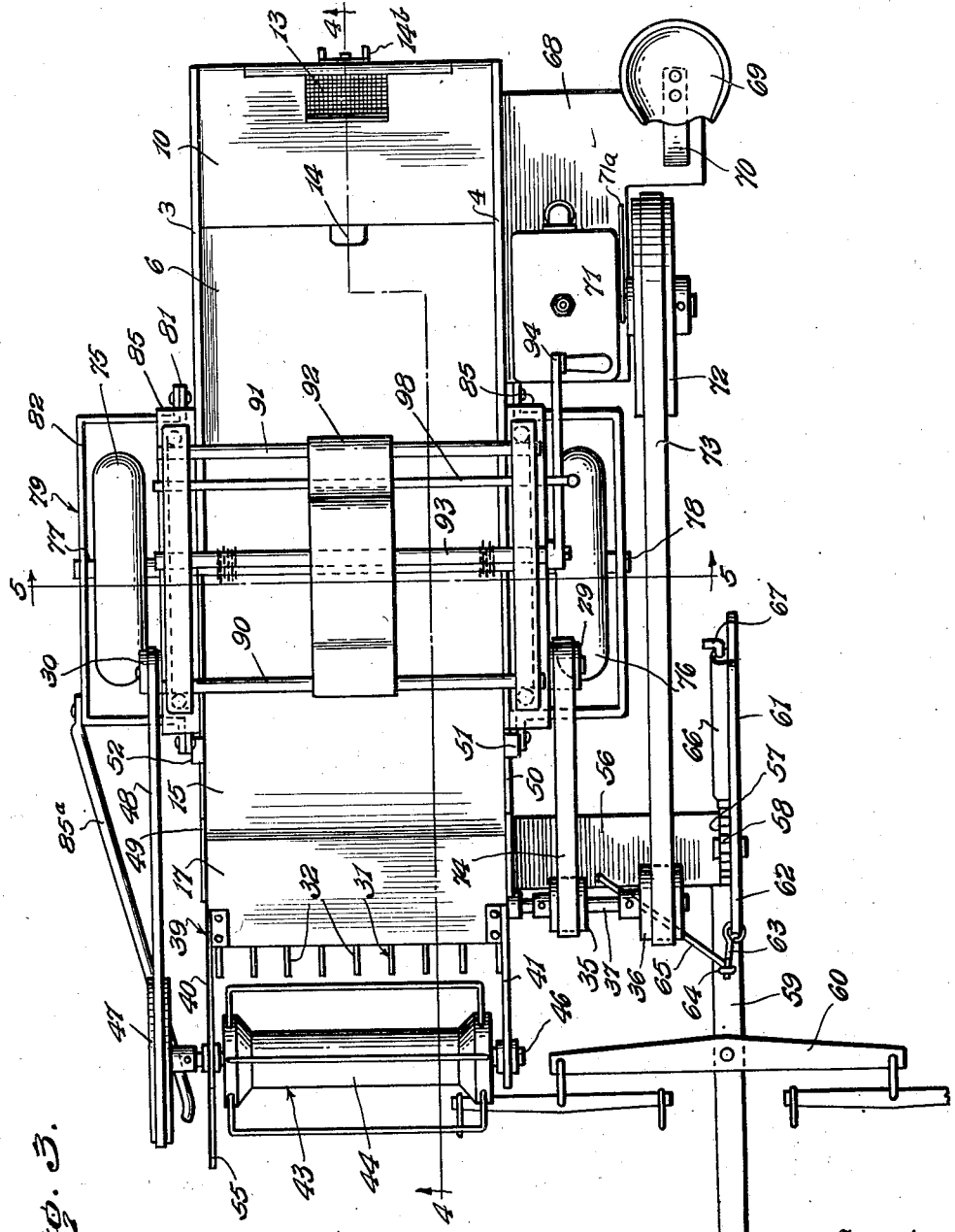

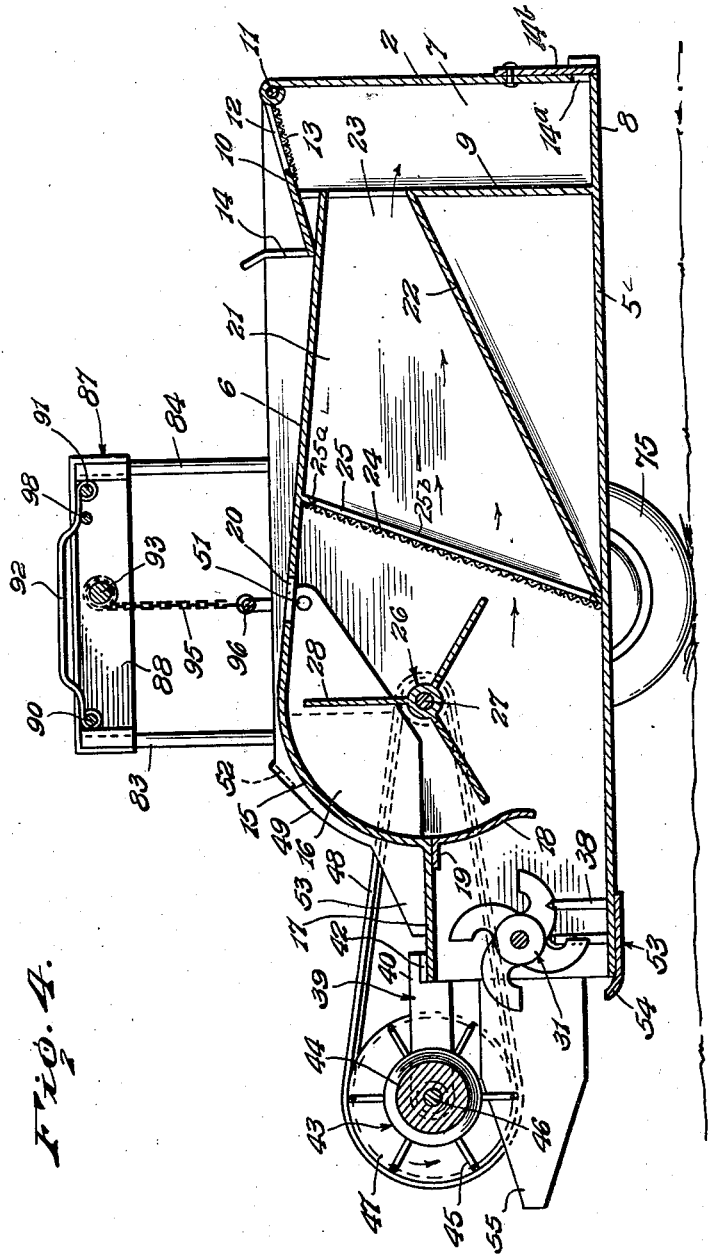

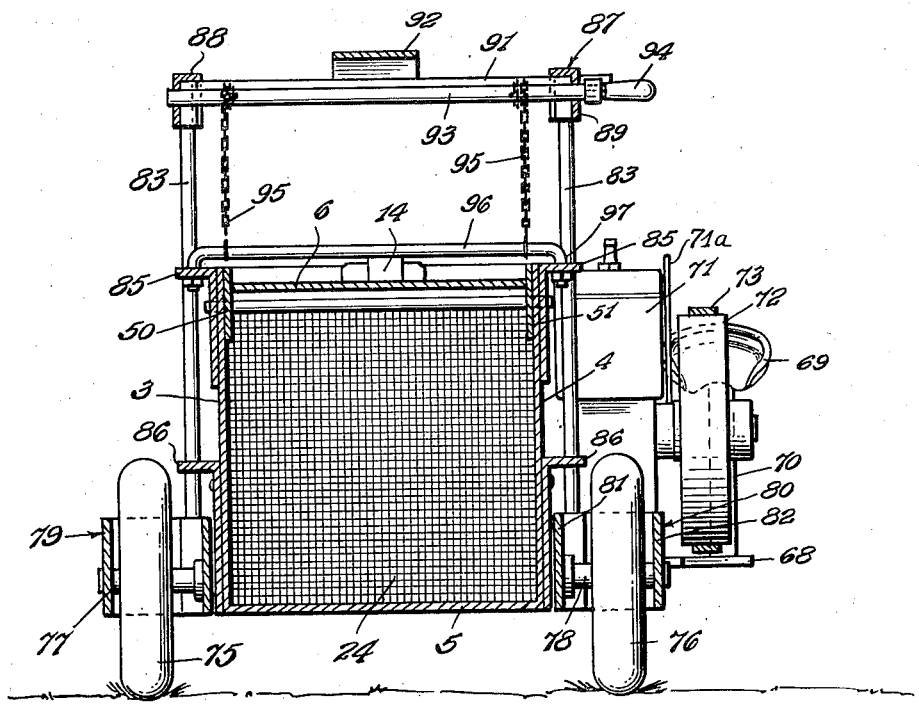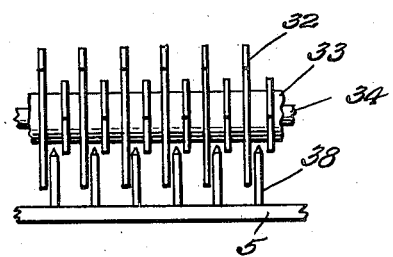

2,245,081

UNITED STATES PATENT OFFICE 2,245,081

HARVESTER COMBINE

John E. Pierce, Denton, N. C., assignor of one-half to Charles C. Hoover, Denton, N. C.

Application May 11, 1939, Serial No. 273,104

5 Claims. (Cl. 56—122)

This invention relates to an improved harvester combine.

One of the principal objects of the invention is to provide a harvester combine which will effectively harvest and thrash any and all kinds of small grain, such as, for example, lespedeza, so that the cost of material, labor and power, ordinarily required for a plurality of operations usually necessary, will be eliminated.

Another object of the invention is to provide a harvester combine which will, in one operation, strip the grain heads from their stalks, without the necessity of cutting the grain, and will forcibly drive the stripped heads through the machine wherein they will be screened and finally deposited, free from chaff, in a grain tank at the rear of the machine, all of these operations being accomplished by the use of one source of power in the one machine.

Another object of the invention is to provide a machine of this nature wherein mechanism is employed for permitting raising and lowering of the machine for accommodating said machine for harvesting various kinds of grain.

Another object of the invention is to provide a harvester combine which will be extremely light in weight and simple in operation and which, therefore, may be operated by one man and a pair of horses, or a tractor.

And as a still further object, the invention seeks to provide a harvester combine which, in view of its simplicity in its construction, will be relatively cheap to manufacture.

Other and incidental objects of the invention, not mentioned hereinbefore, will become apparent during the course of the following description.

My invention is illustrated in the accompanying drawings, wherein:

Figure 1 is a side view of my machine looking at the right side thereof,

Figure 2 is a side view of the machine looking at the left side thereof,

Figure 3 is a top plan view of my improved harvester combine,

Figure 4 is a longitudinal sectional view on the line 4—4 of Figure 3,

Figure 5 is a transverse vertical view on the line 5—5 of Figure 3, and

Figure 6 is a fragmentary plan view of the stripping or thrasher rotor and its cooperating teeth.

Referring now more particularly to the accompanying drawings, wherein similar numerals of reference will be seen to designate like parts throughout the various views, the numeral 1 indicates in general the body of my improved harvester combine. The body 1 is preferably formed of heavy sheet metal and is substantially rectangular in top plan. The body 1 includes a rear end wall 2 and side walls 3 and 4. A bottom wall 5 is, of course, provided, and said body has a downwardly offset top wall 6 which inclines toward the rear end of the body and terminates short of said rear end. As best seen in Figure 4 of the drawings, the rear end wall 2 provides one wall of a seed tank 7. The bottom wall 5 is extended to define a bottom wall 8 for the seed tank and said seed tank has a vertically extending inner wall 9 which extends substantially half the height of the body. A closure 10 is provided for the seed tank 7 and said closure is swingingly connected to the wall 2 by means of a hinge 11. The closure 10 is apertured at 12 and is provided with a screen 13 which allows free entry of air to within the seed tank so that the seed or grain in the seed tank will be kept in good condition. Also, the aperture 12 permits escape of air from the tank. The closure 10 is provided, medially of its forward edge, with an upstanding handle 14 which permits ready swinging of the closure to opened or closed position. The seed tank 7 is provided with a discharge opening 14a which is normally closed by a gate 14b.

As will be clearly seen in Figure 4 of the drawings, the top wall 6 extends throughout the major portion of the length of the body 1 and said top wall 6 is curved, at 15, to define a portion of a fan housing 16, at the forward end of the machine. The wall 6 is formed with an extension 17, which extends in parallel relation to the bottom wall 7, and cooperates therewith to define a mouth for the reception of grain to be thrashed or stripped, in a manner to be described hereinafter. A baffle 18 extends downwardly in the same arc with that of the portion 15 and provides additional housing means for the fan housing 16. The baffle 18 has a flange 19 which is secured to the under face of the portion 17 at the junction thereof with the curved portion 15, by welding or riveting. The ends of the baffle are welded to the side walls 2 and 3. Formed in the top wall 6 near the curved portion 15 is a vent opening 20. Mounted in the body 1 and extending from its mid portion toward its rear, and opening into the seed tank 7, is a chute 21. The chute 21 is defined by the top wall 6 and an inclined wall 22 which has its forward, or lower end, secured to the bottom wall 7 substantially medially of its length, and its rear or upper end secured to the upper edge of the wall 9. The rear and upper end of the wall 22 and the under side of the wall 6, near its rear end, cooperate with the side walls 2 and 3 to define a relatively large mouth 23 for the chute 21. The relatively large mouth will, of course, facilitate passage of grain into the seed tank 7. Extending obliquely upwardly and rearwardly throughout the entire width and height of the body, and between the bottom wall 5 and the top wall 6 is a screen 24. The screen 24 is mounted on a frame 25 which is formed by a flange 25a on the under side of the top wall 6 and the inner end of the inclined wall 22 of the chute 21. Said flanges 25b are also provided for the frame. The screen is, as will be understood, located at the inlet mouth of the chute and will effectively screen any undesirable matter from seed or grain passing from the forward end of the machine into the chute 21.

Mounted in the body 1 and having its ends journaled in the side walls 3 and 4 is a blower fan 26. The blower fan 26 is mounted on a shaft 27 and includes a plurality of blades 28 which may be of any suitable number, three being shown. Pulleys 29 and 30 are carried on the opposite ends of the shaft 27, exteriorly of the body.

Mounted at the forward end of the body 1, and between the portion 14 and the forward end of the bottom wall 5, is a thrasher rotor which is shown generally by the numeral 31. The thrasher rotor is seen in detail in Figure 6 of the drawings and includes thrasher blades 32 which are substantially S-shape in contour and are spaced longitudinally along the hub 33 of said rotor. A shaft 34 rotatably mounts the thrashing rotor in the forward end of the body, and said shaft is, as best seen in Figure 3 of the drawings, provided with a pair of pulleys 35 and 36 which are arranged in horizontally spaced relation to an extension 37 of said shaft 34. As shown, the driving pulley 36 is of slightly greater diameter than the pulley 35. Mounted on the bottom wall 5 at its forward end for cooperation with the rotor blades 32 are teeth 38 which are arranged in a pair of longitudinally spaced series between alternate rotor blades 32.

Mounted at the forward end of the machine and connected to the forward end of the portion 17 is a reel mounting bracket 39 which has arms 40 and 41 extending parallel to each other and forwardly above the forward end of the body 1. Each of the arms 40 and 41 has an ear 42 through which extend rivets for appropriately securing the rear mounting bracket in proper operative position. Braces 42a extend between the free ends of the arms 40 and 41 and the lower portions of the side walls of the body. Mounted on the bracket 39 in overhanging relation forwardly of the body 1 is a reel 43. The reel 43 includes a spool 44 having U-shaped reel members 45 thereon, said reel members being arranged in an angularly spaced radially extending series. As clearly seen in Figure 3 of the drawings, the reel 43 has a shaft 46 with its end portions journaled in the arms 40 and 41 of the bracket 39. A relatively large pulley 47 is mounted on the shaft 46 at one side thereof and is rotatably connected with the pulley 30 by a belt 48.

At each side of the housing 16, the body 1 is cut-away to define air inlets, and these air inlets are closed by plates 49 and 50 which are pivotally connected with the body, as best seen in Figure 4, by studs 51. The plates 49 and 50 are each provided with a laterally directed handle 52, and said plates are also provided with forwardly extending portions 53 which engage the forward portion of the body 1. The plates 49 and 50 provide wind doors for the housing 16 and thus allow the fan 26 to be supplied with the necessary amount of air. As stated, the plates 49 and 50 may be shifted to various positions for regulating the amount of air to enter the housing. Said plates will be held in adjusted position by frictional engagement with adjacent parts of the body.

Attached to the forward end of the bottom wall 7 is a guard 53 which has an upwardly turned lip 54. The guard 53 extends laterally throughout the width of the body and serves to protect the forward edge of said body. Connected to the forward edge of the side wall 3 and projecting forwardly beneath the arm 40 of the bracket 39 is a guard member 55 which is adapted for protecting persons working with the machine from injury with the blades of the rotor of the thrasher. As best seen in Figures 2 and 3 of the drawings, the body 1 is provided with a bracket 56 which extends laterally in the same horizontal plane with the bottom wall 7. The bracket is substantially L-shaped and extends outwardly for a distance equal to substantially half the width of the machine, and said bracket is provided with an upstanding arm 57 which is formed, at its upper end portion, with a toothed sextant or rack 58. Swingingly connected with the arm 57 of the bracket 56 near the lower end of said arm is a tongue 59, and mounted on said tongue is a double-tree assembly 60 to which may be hitched a pair of horses. Mounted on the arm 57 near its upper end is a lever 61, the lever having a downwardly extending portion 62 which is pivotally connected, by a link 63, to a loop 64 which is mounted on the tongue 59. Extending between the mid portion of the bracket 56 and the tongue 59 is a brace rod 65. Mounted on the lever 61 is a detent sleeve 66 having a spring actuated detent 67 therein. The detent 67 has a tooth at its lower end which is engageable selectively with the teeth of the sextant 58. By referring to Figures 2 and 3 of the drawings, it will be understood that, by shifting the lever 61 with respect to the arm 57, the rear end of the tongue 59 may be swung to raised and lowered positions. When a pair of horses are connected to the tree 60, and the lever 61 is shifted, the forward end of the machine will be rocked to raised or lowered positions, depending upon the position of said lever 61. In other words, when the lever 61 is positioned for raising the rear end of the tongue to its maximum height, the forward portion of the machine will be allowed to shift upwardly whereas, when the lever is shifted to the opposite position, the forward portion of the machine will be rocked downwardly. The advantage for this structure is that the mouth or forward end portion of the body 1 may be positioned for receiving grain of various lengths.

Mounted on the body 1 at its rear end, and forming an extension of the bottom wall 5, is a platform 68 which extends laterally for a distance substantially equal to that of the bracket 56. The platform 68 has a seat 69 mounted thereon which seat is supported by a leaf-spring type support 70.

In order to provide power for operating the fan, reel and thrasher rotor, I provide a motor 71. The motor 71 is mounted on the platform 68 near its forward end and is provided with a pulley 72. The motor 71 is of conventional design and may be of any suitable power. It has been found that a motor of substantially ten horse power will operate in an entirely satisfactory manner for driving the machine. A belt 73 connects the pulley 72 of the motor 71 with the pulley 36. It will now be understood that the motor 71 will, through the belt 73 and pulley 36, conduct power to the shaft 37. A belt 74 will conduct power from the pulley 35 to the pulley 29, for driving the fan 26. As heretofore stated, the belt 48 leads power from the pulley 30 to the reel pulley 47, for driving the reel. The thrasher rotor is, of course, driven directly from the extension of the shaft 37. The extension 37 is preferably an integral part of the shaft 34. It is believed that the manner of driving the various rotatable parts of the machine will now be clearly understood.

I provide road wheels 75 and 76 which are mounted on stub shafts 77 and 78. The wheels 75 and 76 are mounted in wheel housings 79 and 80 which are of substantially rectangular formation and are, as best seen in Figure 5, located adjacent the side walls 3 and 4. The wheel housings 79 and 80 are each provided with inner and outer walls 81 and 82. Rigidly connected to the inner walls 81 at their opposite corresponding ends are mounting rods 83 and 84 which rods extend vertically in parallel spaced relation beyond the upper limits of the body. The rods 83 and 84 have their lower ends mounted in sleeves 83a which are mounted on the wheel housings. The mounting rods 83 and 84 are slidably received through arms of vertically alined guide brackets 85 and 86, a pair of which brackets are carried at each side of the body 1. The brackets are preferably riveted to the side walls 2 and 3.

Mounted on the wheel housing 79 extending forwardly and inwardly with respect to the body and terminating forwardly of the forward end and beneath the reel is a guard rod 85a.

By referring to Figure 5, it will be seen that the rods 83 and 84 are carried at each side of the machine and are located in laterally aligned position so that their upper ends are arranged to provide horizontal supports for a raising frame which is shown generally at 87. The raising frame includes cross members 88 and 89 and cross members 90 and 91 which members 90 and 91 are connected by a bracing strip 92. A mandrel 93 extends laterally of the frame 87 and has a crank 94 connected to one end thereof. Chains 95 connect the mandrel with a cross bar 96 which has end portions 97 connected with the brackets 85 medially of their lengths. As will be clearly seen, the cross bar 96 extends in parallel vertically aligned relation with the mandrel 93. Rotation of the mandrel 93 by the handle or crank 94 will effect raising of the body 1 on the rods 83 and 84. A stop rod 98 extends laterally between the side members of the frame 87 and is engageable with the arm of the crank 94 for rotating said crank against unwinding movement past a predetermined set position. The body 1 may thus be retained in a desired raised or lowered position with respect to the road wheels 75 and 76.

It is thought that the operation of my improved harvester combine will be understood from the foregoing. A brief discussion of the operation is not thought to be out of place, however. After horses have been hitched to the trees 60 of the machine and said machine is drawn to the field to be harvested, the motor 71 is started and suitable conventional clutch mechanism shown at 71a engaged for causing rotation of the pulley 72, it being understood that, previously, the lever 61 and mandrel 93 have been adjusted for raising the body to the desired height for the grain to be harvested. Rotation of the pulley 72 will cause rotation of the blades 32 of the thrasher rotor 31, and also rotative movement will be conveyed to the fan 36 and to the reel 43. The reel 43 will feed the grain into the thrasher rotor, when the knives will strip the grain from the stalks. The fan 26 will blow the grain through the screen 24, said screen removing undesired particles, and through the chute 21 into the seed or grain tank 7. The chaff will be allowed to escape through the opening 20 in the top wall 6.

It is desired particularly to call attention to the fact that my improved harvester combine will, in one operation, harvest the grain, thrash it, and clean it and convey it to a seed tank, where it may be removed as desired. By the use of my machine, a plurality of operations heretofore necessary will be eliminated. It is desired again to state that it will not be necessary, when using my machine, to cut the grain stalks.

It is thought that further description of the invention is unnecessary.

Having thus described the invention, what is claimed as new is:

1. In a harvester combine, a body, a thrasher rotor carried by the body and having blades, a blower fan carried by the body, a chute, a seed tank connected with the chute at one end thereof, and a screen mounted in the opposite end of the chute, said blower fan being mounted in the body above and inwardly of the thrasher rotor and being adapted for forcing grain thrashed by the thrasher rotor through the screen and chute into the seed tank.

2. In a harvester combine, a body, a seed tank carried by the body at its rear end, a chute carried by the body and having a discharge mouth opening into the seed tank, a screen mounted in the body forwardly of the chute, a fan housing in the body, a blower fan mounted for rotation in the housing above the fan housing, a thrasher rotor operatively mounted in the body at its forward end, teeth mounted for cooperation with the thrasher rotor, a bracket connected with the body, a reel carried by the bracket, and means for conveying rotatable movement to the reel, thrasher rotor and blower fan, said reel being rotatable for conveying grain to be harvested past the teeth to the thrasher rotor and said fan being rotatable for blowing thrashed grain from beneath the rotor through the screen and chute to the seed tank.

3. In a harvester combine, a body having a rear end wall and a bottom wall, a seed tank carried by the body and being partially defined by the rear end wall and bottom wall, a closure for the seed tank, an inclined wall in the body, a top wall for the body, said top wall and inclined wall defining a chute, said chute having a discharge opening leading into the seed tank, said top wall being extended forwardly and provided with a curved portion defining a housing, a frame in the body forwardly of the chute, a screen carried on the frame, a baffle connected with the curved portion of the top wall, a fan in the housing, wind doors located at opposite sides of the housing for regulating flow of air to the interior of said housing, a thrasher rotor, means mounting the thrasher rotor in the forward end of the housing, a reel bracket and reel carried by the bracket, a motor carried by the body, and means conveying rotative movement from the motor to the thrasher rotor and thence to the fan and thence to the reel, said reel being rotatable for feeding grain to be thrashed by the thrasher rotor and said blower fan blowing thrashed grain from a point beneath and inwardly of the rotor through the screen and chute into the seed tank.

4. In a harvester combine, a body, a seed tank carried by the body, a chute carried by the body and communicating with the seed tank, a thrasher rotor in the body, a fan, a housing for the fan, a reel, a motor carried by the body, means for communicating rotative movement from the motor to the thrasher rotor, fan and reel, said reel being rotatable for feeding grain to the thrasher rotor and said blower fan being rotatable for blowing thrashed grain from a point beneath the thrasher rotor through the chute and into the seed tank, road wheels, and means for raising and lowering the body with respect to the road wheels.

5. In a harvester combine, a body, road wheels, wheel housings, means rotatably mounting the wheels in the wheel housings, brackets carried by the body, mounting rods carried by the wheel housings and slidable in the body, a raising frame carried by the upper end of said rods and having side plates and cross rods, a mandrel rotatably carried in said raising frame, a crank on the mandrel, a cross bar carried by the body on certain of said brackets, and flexible means connected between the mandrel and said cross bar, said crank being rotatable for rotating the mandrel whereby the body will be lifted on the mounting rods and thereby shifted with respect to the wheels and wheel housing.

JOHN E. PIERCE.